US012337352B2

(12) United States Patent
Mongrenier et al.

(10) Patent No.: US 12,337,352 B2
(45) Date of Patent: Jun. 24, 2025

(54) DEVICE FOR SORTING A CONTAINER, AND ASSOCIATED FACILITY AND METHOD

(71) Applicant: WID GROUP, Bernay (FR)

(72) Inventors: Alexandre Jean Antoine Mongrenier, Manneville-sur-Risle (FR); Benoit Eric Sudre, Bordeaux (FR)

(73) Assignee: WID GROUP, Bernay (FR)

( * ) Notice: Subject to any disclaimer, the term of this patent is extended or adjusted under 35 U.S.C. 154(b) by 0 days.

(21) Appl. No.: 17/597,331

(22) PCT Filed: Jul. 3, 2020

(86) PCT No.: PCT/EP2020/068882
§ 371 (c)(1),
(2) Date: Jan. 3, 2022

(87) PCT Pub. No.: WO2021/001554
PCT Pub. Date: Jan. 7, 2021

(65) Prior Publication Data
US 2022/0314282 A1 Oct. 6, 2022

(30) Foreign Application Priority Data
Jul. 3, 2019 (FR) ....................................... 1907390

(51) Int. Cl.
*B07C 5/34* (2006.01)

(52) U.S. Cl.
CPC .......... *B07C 5/3412* (2013.01); *B07C 5/3404* (2013.01)

(58) Field of Classification Search
CPC ....... B07C 5/3404; B07C 5/3412; B07C 5/34; B07C 5/36; B07C 5/38
See application file for complete search history.

(56) References Cited

U.S. PATENT DOCUMENTS 3,386,579 A 6/1968 Schulze et al.
4,253,573 A * 3/1981 Dubberly .............. G07F 7/0609 209/936

(Continued)

FOREIGN PATENT DOCUMENTS

CN 102218404 11/2012
CN 204842244 12/2015

(Continued)

OTHER PUBLICATIONS

International Search Report issued for International Patent Application No. PCT/EP2020/068882, dated Sep. 24, 2020 in 6 pages.

*Primary Examiner* — Patrick H Mackey
(74) *Attorney, Agent, or Firm* — Knobbe, Martens, Olson & Bear, LLP

(57) ABSTRACT

A device is for sorting a container for a conveyor. The container includes an electronic chip storing at least one data item relating to the container or to the chip. The conveyor is capable of driving the container and has a first and a second path. The sorting device includes a chip reader configured to read the stored data, which can be referred to as read data. The device also has an arm, which is movable between a first position and at least one guiding position. In the guiding position, the arm is configured to force the container of the first path to follow the second path. The device further includes a calculator adapted to output a control law for the arm, which controls the position of the arm and depends on the read data.

7 Claims, 10 Drawing Sheets

(56) References Cited

U.S. PATENT DOCUMENTS

| | | | | |
|---|---|---|---|---|
| 4,369,873 | A | 1/1983 | Heuft | |
| 4,691,231 | A | 9/1987 | Fitzmorris et al. | |
| 7,896,151 | B2 * | 3/2011 | Meisinger | B65G 43/08 198/419.2 |
| 9,511,910 | B2 * | 12/2016 | Puccini | B65D 51/245 |
| 9,789,517 | B2 * | 10/2017 | Doublet | B07C 5/02 |
| 2004/0133484 | A1 * | 7/2004 | Kreiner | B07C 5/3412 705/28 |
| 2022/0314282 | A1 * | 10/2022 | Mongrenier | B07C 5/3412 |

FOREIGN PATENT DOCUMENTS

| | | | | | |
|---|---|---|---|---|---|
| CN | 205904120 | | | 1/2017 | |
| CN | 104692098 | | | 3/2017 | |
| CN | 110639834 | A | * | 1/2020 | |
| DE | 102010062830 | | | 6/2012 | |
| EP | 0029614 | A1 | * | 5/1979 | |
| EP | 3433799 | | | 1/2019 | |
| FR | 2400395 | | | 3/1979 | |
| FR | 3059448 | A1 | * | 6/2018 | G05B 19/042 |
| GB | 2065869 | A | * | 7/1981 | B07C 5/3412 |
| NL | 7707169 | A | | 12/1977 | |
| WO | 2011/029991 | A2 | | 3/2011 | |
| WO | WO 2018/099986 | | | 6/2018 | |
| WO | 2018/141772 | A1 | | 8/2018 | |

* cited by examiner

DEVICE FOR SORTING A CONTAINER, AND ASSOCIATED FACILITY AND METHOD

FIELD OF THE INVENTION

The present invention relates to a device for sorting a container. The invention also relates to a sorting facility comprising such a sorting device. The invention also relates to a container-sorting method.

BACKGROUND OF THE INVENTION

The invention relates to the field of container logistics.

Such containers are, for example, bottles of wine.

When a consumer buys a bottle of wine, the bottle of wine has travelled a long way from harvest to delivery to the consumer.

In such a case, the path followed by the bottle of wine involves a plurality of actors, including a producer, a distributor and a retailer, with the consumer buying from the retailer.

Each of these actors carries out multiple operations.

For the wine producer, winemaking takes place in seven main stages.

In the first stage, the harvesting of the grapes is carried out. The grapes must be harvested at the right time, and determining this time requires a great deal of skill. Depending on the case, harvesting is done by hand or with harvester machines. At harvest time, bunches of grapes are sorted, in particular to eliminate unsuitable fruit.

In a second step, crushing and pressing take place. The crushing and pressing step is usually carried out automatically to obtain a juice.

The third step is fermentation, usually carried out in a fermentation chamber. The juice undergoes a chemical transformation, alcoholic fermentation, during which the glucose becomes ethanol.

The next step is clarification to remove all waste and residue from the wine. The clarification is implemented by a filter or by fining.

The sixth step is to bottle the wine. The wine is bottled after the maturation phase. During this bottling stage, the bottles are sterilised. A rinser is then used to wash the empty bottles, then a filler to fill the bottles with wine, and finally a corker to put a stopper on the neck of the bottles. The bottling stage also includes overcapping and labelling.

The seventh step is the crating of the wine.

The cases of wine are then stored and sent to the distributor. These operations are standard logistics operations. The same types of operations take place at the distributor and the retailer.

However, it is desirable that the pace of all the above-mentioned stages and operations be accelerated due to the growing demand for wine, without reducing quality.

Such a desire runs up against the fact that all the stages and operations described above are perfectly controlled and automated, so that increasing the rate of production requires optimisation of each stage and operation and, in particular, of the wine crating stage. Specifically, during the crating stage, it is desirable to check the distributor's or retailer's order in a controlled and optimal manner.

There is therefore a need for a logistical device that can be easily implemented to increase the capacity to deliver the products contained in the containers and to enable accelerated checking of container orders.

SUMMARY OF THE INVENTION

To this end, the present description relates to a sorting device for sorting a bottle containing an alcoholic liquid for a conveyor of bottles containing an alcoholic liquid, the bottle containing the alcoholic liquid comprising an electronic chip comprising a memory storing at least one data item from among a data item relating to the bottle containing the alcoholic liquid and a data item relating to the electronic chip, the conveyor being suitable for moving the bottle containing the alcoholic liquid, the conveyor having at least a first path and a second path, the sorting device comprising a chip reader configured to read the at least one data item stored in the memory of the electronic chip, called the read data, an arm movable between a first position and at least one second guiding position, the at least one second guiding position being distinct from the first position, and in the at least one second guiding position, the arm being configured to force the bottle containing the alcoholic liquid from the first path to follow the second path, a calculator adapted to deliver a law for controlling the arm to control the position of the arm, the law for controlling the arm depending on the at least one read data.

According to particular embodiments, the sorting device comprises one or more of the following features taken in isolation or in any combination that is technically possible:

- the arm is away from the first path and in the at least one second guiding position, the arm extends at least partially across the first path.
- the arm is movable between a first position and a plurality of second guiding positions to force the bottle containing the alcoholic liquid along the second path, the arm extending at least partially across the first path in each second guiding position.
- the arm forms a pusher and can be moved in translation between the first position and the at least one second position, the arm having in particular a distal end intended to be in contact with the bottle containing the alcoholic liquid.
- the arm is rotatable between the first position and the at least one second guiding position, the arm having in particular a barrier intended to be in contact with the bottle containing the alcoholic liquid.
- the calculator comprises a memory storing at least one database, the at least one database comprising at least one predefined data item from among a predefined data item relating to the bottle containing the alcoholic liquid and a predefined data item relating to the electronic chip, and the calculator is adapted to compare the at least one read data with the at least one predefined data item in order to determine a defective state of the electronic chip, the control law of the arm depending on the defective state of the electronic chip.
- the sorting device comprises a trim unit of the bottles containing the alcoholic liquid configured to deposit a microchip on the bottle containing the alcoholic liquid.

The present description also relates to a facility for sorting a bottle containing an alcoholic liquid, the facility comprising a conveyor suitable for moving the bottle containing the alcoholic liquid to be sorted, and a sorting device for sorting bottle containing an alcoholic liquid, container, the sorting device being configured to sort the bottle containing the alcoholic liquid moved by the conveyor.

The present description further relates to a sorting method implemented by a sorting device for sorting a bottle containing an alcoholic liquid for a conveyor of bottles containing an alcoholic liquid, the bottle containing the alcoholic liquid comprising an electronic chip comprising a memory storing at least one data item from among a data item relating to the bottle containing the alcoholic liquid and a data item relating to the electronic chip, the conveyor being suitable for moving the bottle containing the alcoholic liquid, the conveyor having at least a first path and a second path, the sorting device comprising a chip reader configured to read the at least one data item stored in the memory of the electronic chip, called the read data, an arm movable between a first position and at least one second guiding position, the at least one second guiding position being distinct from the first position, and in the at least one second guiding position, the arm being configured to force the bottle containing the alcoholic liquid from the first path to follow the second path, a calculator adapted to deliver a law for controlling the arm to control the position of the arm, the law for controlling the arm depending on the at least one read data, the method comprising the steps of: the chip reader reading the at least one data item saved by the memory of the electronic chip of the bottle containing the alcoholic liquid, the calculator delivering the control law depending on the at least one read data, and the controlling of the arm's position based on the arm control law.

BRIEF DESCRIPTION OF THE DRAWINGS

Other characteristics and advantages of the invention will become apparent upon reading the following description of embodiments of the invention, given only as an example and referencing the drawings, in which.

DETAILED DESCRIPTION OF THE PREFERRED EMBODIMENTS

Figure 1:
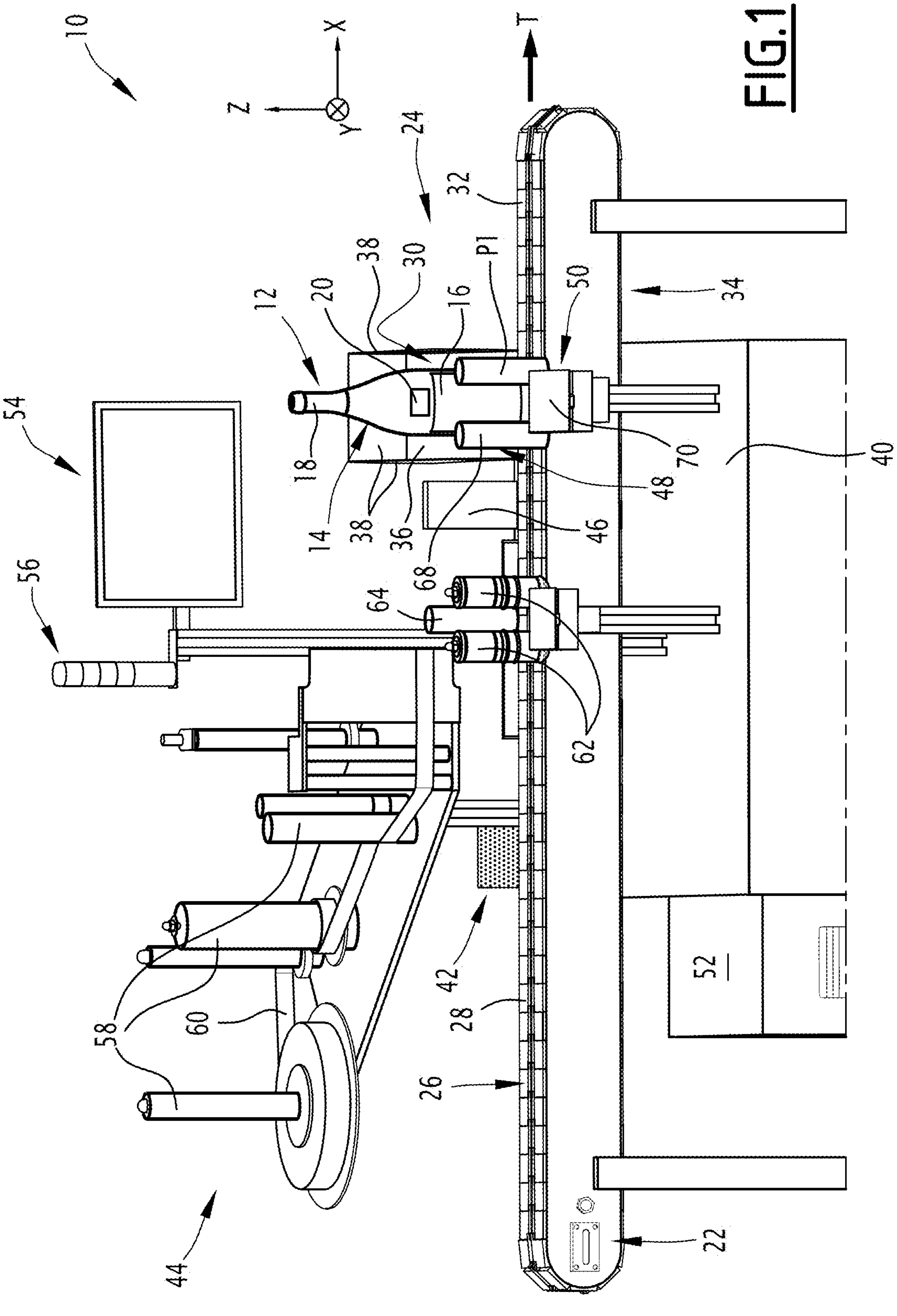
FIG. 1, a perspective view of a container sorting facility comprising a sorting device with an arm in a first position, FIG. 2, a schematic top view of a part of the facility of FIG. 1, in which an arm of the sorting device has a first position, FIG. 3, a schematic top view of a part of the facility of FIG. 1, in which an arm of the sorting device has a second position, FIG. 4, a view of the arm in a second position distinct from that of FIG. 3, FIG. 5, a view of the arm in a second position distinct from that of FIG. 4, FIG. 6, a view of the arm in a second position distinct from that of FIG. 5, FIG. 7, a schematic view of another example of an arm in a first position, FIG. 8, a schematic view of the arm of FIG. 7 in a second position, FIG. 9, a schematic view of the arm of FIG. 7 in a second position distinct from that of FIG. 8, and FIG. 10, a schematic view of the arm of FIG. 7 in a second position distinct from that of FIG. 9.

A container sorting facility 10 is depicted in FIG. 1. The sorting facility 10 is designed to sort a plurality of containers 12.

The containers 12 to be sorted are, for example, containers 12 which are part of an order of containers and which are to be sorted. For example, containers are also intended to be accounted for.

Furthermore, in the present description, a longitudinal direction is defined. The longitudinal direction is represented by the X-axis and is referred to in the following as the "longitudinal direction X".

A transverse direction perpendicular to the longitudinal direction X is also defined. The transverse direction is represented by a Y-axis and is referred to in the following as the "transverse direction Y". A dimension of a facility element 10 measured in the transverse direction Y is called "width".

A vertical direction perpendicular to the longitudinal direction X and the transverse direction Y is also defined. The vertical direction is represented by a Z-axis and is referred to in the following as the "vertical direction Z". Furthermore, in the present description, it is understood that an element A is located below an element B, when element A has a lower elevation than element B, in the vertical direction Z.

Each container 12 is, for example, a bottle 12.

Each bottle 12 contains a liquid substance. In the example given, the liquid substance is wine. More generally, the liquid substance is alcohol.

In another embodiment, the liquid substance is spirits.

In another embodiment, the bottle 12 is a perfume bottle. In this situation, the bottle 12 is sometimes referred to as a flask.

As shown in FIG. 1, the bottle 12 has a barrel 14, a label 16, a cap 18 and a chip 20.

The barrel 14 is the main and largest part of the bottle 12. The barrel is sometimes referred to as the "body".

The electronic chip 20 is referred to as "chip 20" in the following.

The chip 20 is visible and positioned on the barrel 14, for example above the label 16.

The chip 20 is adhesively bonded to the barrel 14.

Alternatively, the chip 20 is present on a location other than the barrel 14 of the bottle 12.

Alternatively, the chip 20 is invisible. In this case the chip 20 is positioned under the label 16, under a back label (not visible in the figures) of the bottle 12 or under the sealing cap 18.

In the following, a chip 20 refers to any electronic device (integrated circuit) that can store at least one piece of information and communicate with another device using a contactless communication protocol. In other words, the chip 20 is a first wireless telecommunication means.

The chip 20 comprises a microprocessor (not shown in the figures) associated with an antenna (not shown in the figures) for signal exchange. The microprocessor also has a memory for storing information.

The chip 20 is thus associated with information that the microprocessor memory stores.

The chip 20 stores in its memory at least one data item relating to the bottle 12.

By way of illustration, the data item relating to the bottle 12 is identification data for the bottle 12.

For example, the bottle 12 identification data includes a bottle 12 identifier, production site information, the vintage of the contents of the bottle 12, the producer identifier, the nature of the contents of the bottle 12 i.e. whether the contents are a red wine, a white wine, a champagne, a whisky, etc., the name of the bottle 12 profile, data on the date and time of bottling, data on the date and time production ended, the tank from which the wine contained in the bottle 12 comes, identification data of the corker, the batch number of which the bottle 12 is part and/or information relating to the volume of the bottle 12, i.e. the quantity of wine that the bottle 12 contains.

For example, the chip 20 is an RFID (radio frequency identification) chip.

The chip 20 is capable of communicating according to the RFID communication protocol, which complies with the ISO 15693 standard. The communication range is, for example, between 10 cm and 10 metres (m). This communication protocol can also be referred to as a "UHF" communication protocol. The acronym "UHF" stands for ultra high frequency. In such a protocol, the chip 20 is able to transmit or receive a signal with a frequency between 300 MHz and 3000 MHz.

Alternatively, the chip 20 is capable of communicating using an HF RFID communication protocol. The acronym "HF" stands for high frequency. In such a communication protocol, the chip 20 is able to transmit or receive a signal with a frequency between 3 MHz and 30 MHz. Furthermore, in such a protocol, the reading distance of the chip 20 is less than 20 cm.

In one particular case, the chip 20 is suitable for operation in two different frequency ranges. In this sense, the chip 20 can be described as a dual-frequency chip 20. The chip 20 is then adapted to communicate in two distinct frequency ranges. In this case, the chip 20 is adapted to communicate according to the HF communication protocol and/or the UHF communication protocol.

Due to international standards, each chip 20 has a unique identifier that forms a data item for the chip 20. Thus, no two chips 20 can have the same identifier. This identifier is stored in the memory of the chip 20, for example, when the chip 20 is created.

To give a sense of scale, the chip 20 is a rectangle 35 millimetres (mm) long by 20 mm wide. Nevertheless, the chip 20 is not limited to this geometry and can have variable dimensions and shapes (square, rectangular, round, etc.).

The facility 10 comprises a conveyor 22 and a device 24 for sorting a bottle 12.

The conveyor 22 is configured to move the bottles 12 to be sorted.

The conveyor 22 comprises a conveyor belt 26, a first path 28 and at least one second path 30.

In this case, the conveyor belt 26 comprises a plurality of plates articulated to each other.

The conveyor belt 26 is configured to drive the bottles 12 at a constant speed, the so-called bottle driving speed 12, in a driving direction called T, parallel to the longitudinal direction X.

The conveyor belt 26 is thus divided into a forward run 32 and a return run 34.

The forward run 32 is movable in the driving direction T.

The return run 34 is movable in a direction opposite the driving direction T and is located below the forward run 32.

The first path 28 corresponds to the forward run 32 of the conveyor belt 26. The first path 28 is therefore suitable for moving the bottles 12 in the driving direction T at the driving speed.

The first path 28 extends in a plane parallel to the plane X Y defined by the longitudinal direction X and the transverse direction Y, and referred to hereafter as the "plane of the first path 28".

The second path 30 is separate from the first path 28.

The second path 30 is a branch of the first path 28. In particular, the second path 30 is perpendicular to the first path 28.

The second path 30 has a bottom 36 and at least three sidewalls 38 for holding the bottles 12.

The bottom 36 is flush with the forward run 32 of the conveyor belt 26.

The retaining sidewalls 38 project from the bottom 36.

The sorting device 24 is configured to sort a plurality of bottles 12.

The sorting device 24 comprises a holder 40, a bottle detector 42, a trim unit 44, a chip reader 46, an arm 48, a drive unit 50 for the arm 48, a calculator 52, a display unit 54, a human-machine interface (HMI), and a visual indicator 56.

For convenience of description, the sorting device 24 is described in the following in relation to a single bottle 12.

The holder 40 has a parallelepiped shape.

The holder 40 is arranged at least partly under the conveyor 22. The holder 40 at least partly supports the other elements of the sorting device 24.

The detector 42 is configured to detect the presence of the bottle 12 on the conveyor 22.

The trim unit 44 is configured to deposit the chip 20 on the bottle 12.

The trim unit 44 comprises a plurality of holders 58 and means for applying the chip 20 to the bottle 12.

The chips 20 are initially releasably bonded to strips 60 supplied in roll form.

The plurality of holders 58 is configured to support and guide the strips 60 to the applicators.

The applicators comprise at least three rotating cylinders 62 and 64.

Of the three rotating cylinders, two first rotating cylinders 62, known as "positioning cylinders 62", are suitable for positioning the bottle 12 in a position in which the bottle 12 is positioned to receive the chip 20. The positioning cylinders 62 are rotatable about the vertical direction Z.

The third rotating cylinder 64, known as the "application cylinder 64", is configured to apply the chip 20 to the barrel 14 of the bottle 12. The application cylinder 64 is rotatable about the vertical direction Z.

In the present embodiment, the chip reader 46 is adapted to operate according to a communication protocol suitable for writing data relating to the bottle 12 into the chip memory 20 and reading the data stored in the chip memory 20.

The communication protocol comprises at least either the UHF RFID communication protocol or the HF RFID communication protocol.

The chip reader 46 has an active mode of operation in which the chip reader 46 is capable of writing and/or reading the data stored in the chip memory 20 and an inactive mode of operation in which the reader 46 is not capable of writing and/or reading the data stored in the chip memory 20.

For example, the chip reader 46 is connected to the presence detector 42.

The presence detector 42 is able to control the chip reader 46 in the active operating mode or in the inactive operating mode depending on the presence or absence of a bottle 12 on the conveyor 22.

The arm 48 comprises at least one rod 66 (visible schematically in FIGS. 3 to 6) and has a distal end 68.

In this example, the arm 48 has two rods 66 which can be moved in translation in the transverse direction Y, i.e. perpendicular to the driving direction T.

Each end of a rod 66 is provided with a contact element that touches the bottle 12.

The distal end 68 of the arm 48 is formed by the two contact elements and is intended to be in contact with the bottle 12.

The arm 48 is movable between a first position P1 and at least a second guiding position P2.

The first position P1 and the at least one second position P2 are detailed with reference to FIGS. 2 to 6. These figures are schematic representations of a part of the facility 10, in which the distal end 68 of the arm 48 is simplified and is represented by a circle.

Figure 2:
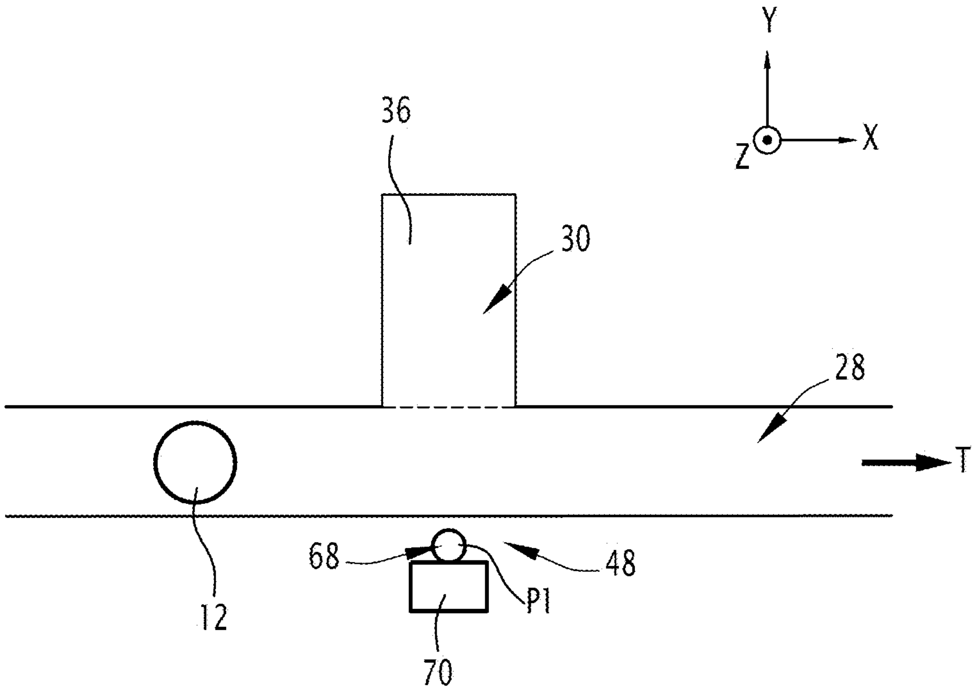

As shown in FIG. 2, in the first position P1, the arm 48 is away from the first path 28.

In other words, in the first position P1, the distal end 68 of the arm 48 and the rods 66 are away from the first path 28.

It is understood that away from the first path 28, the arm 48 allows the bottles 12 to be driven on the first path 28 and is not likely to come into contact with the arm 48.

In this case, when the arm 48 is away from the first path 28, the orthogonal projection of the arm 48 in the plane of the first path 28 is outside the first path 28.

The arm 48 is configured to have a plurality of second guide positions P2, hereafter referred to as "second positions P2".

A plurality of second positions P2 of the arm 48 are illustrated in FIGS. 3 to 6.

Each second position P2 is distinct from the first position P1.

In each second position P2, the arm 48 extends at least partially across the first path 28 in the transverse direction Y. Then, in the second position P2 of the arm 48, the orthogonal projection of the arm 48 in the plane of the first path 28 is located at least partly on the first path 28. In particular, in the second position P2, the orthogonal projection of the distal end 68 of the arm 48 in the plane of the first path 28 is located at least partly on the first path 28.

Figure 3:
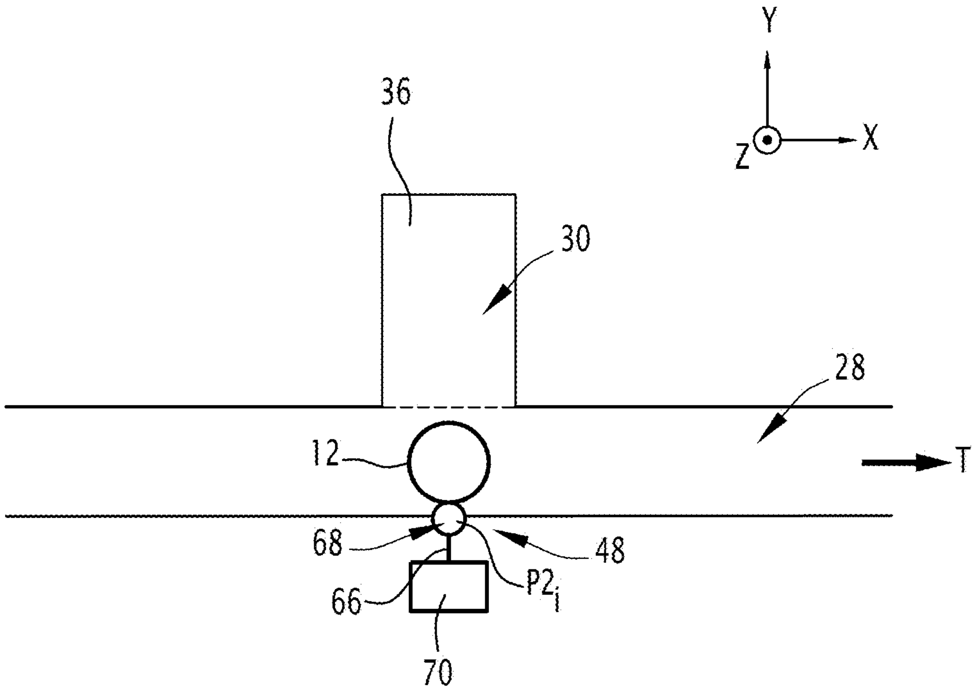
Figure 4:
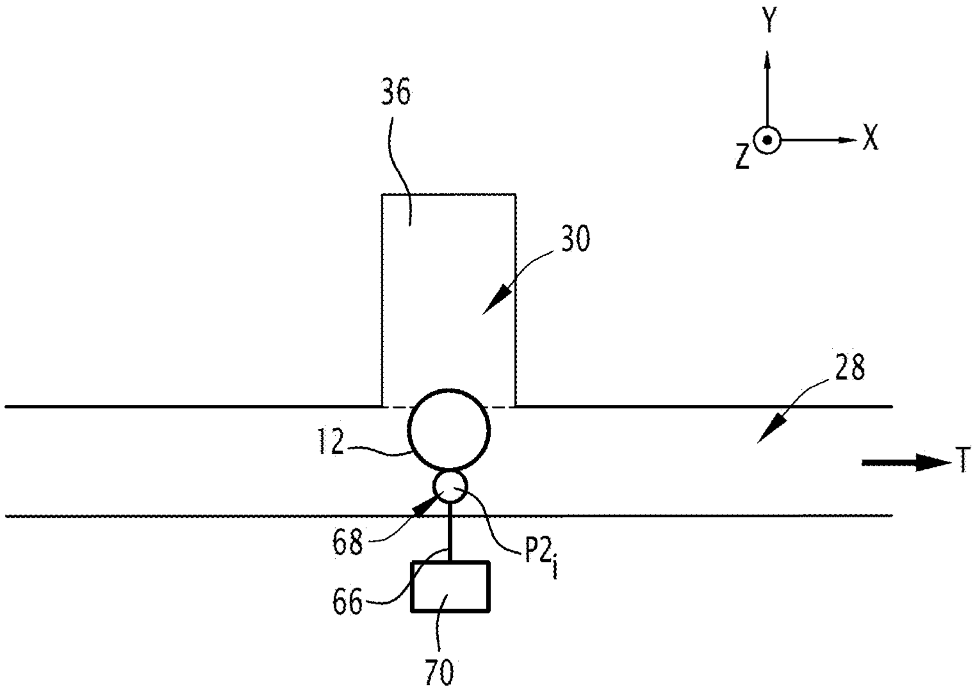
Figure 5:
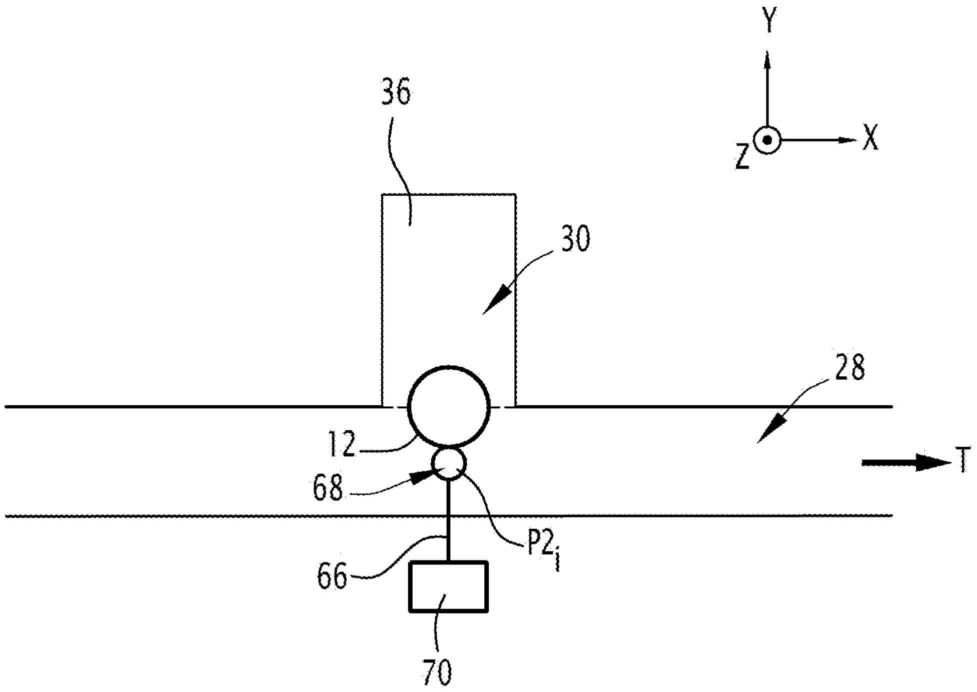

FIGS. 3 to 5 show the arm 48 in second intermediate positions, noted $P2_i$.

In each second intermediate position $P2_i$, the arm 48 extends partially over the first path 28.

Figure 6:
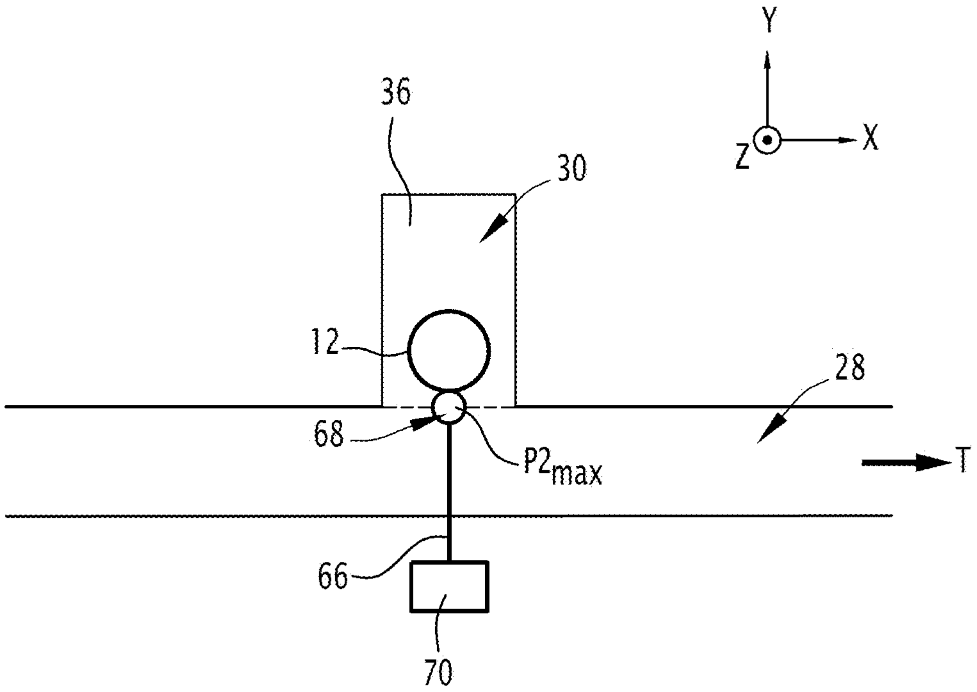
Figure 7:
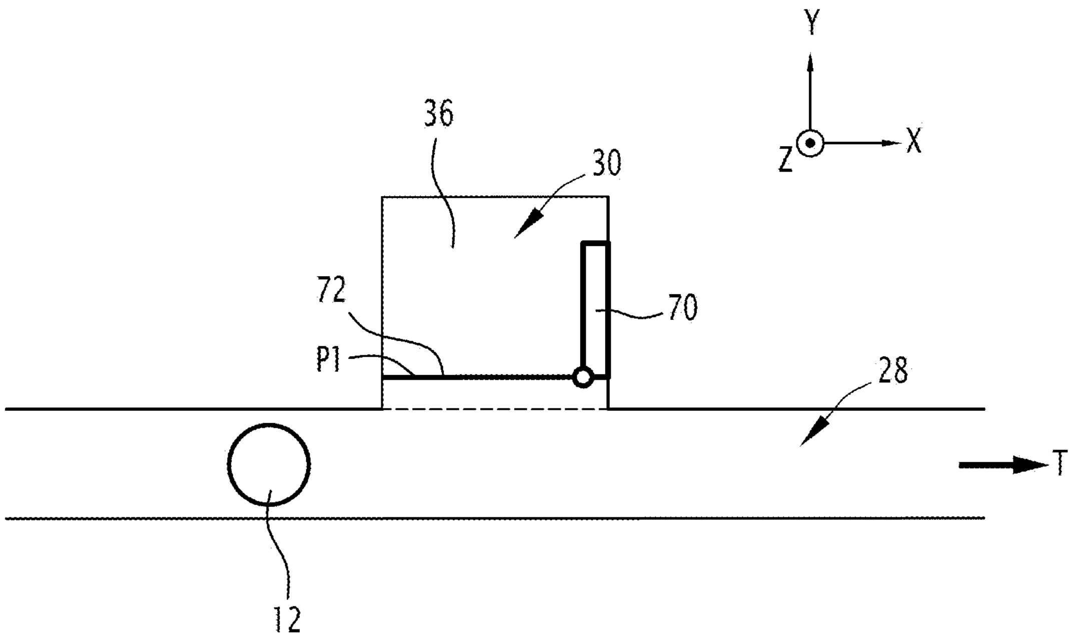

FIG. 6 shows a second position P2 of the arm 48 which corresponds to the maximum extension of the arm 48. The position of maximum extension of arm 48 is noted as $P2_{max}$.

In this case, in the $P2_{max}$ position of maximum extension of the arm 48, the arm 48 extends across the entire first path 28. In other words, the orthogonal projection of the arm 48 in the plane of the first path 28 intercepts the entire width of the first path 28.

Furthermore, in position $P2_{max}$, the distal end 68 of the arm 48 is located at the interface between the first path 28 and the second path 30. The interface between the first path 28 and the second path 30 is shown as a dotted line in FIGS. 2 to 10.

The reference P2 is used to designate either an intermediate position $P2_i$ or the maximum extension position $P2_{max}$. Thus, the arm 48 is translatable along the transverse direction Y between the first position P1 and the plurality of second positions P2 to force the bottle 12 from the first path 28 to follow the second path 30.

In each second position P2, the arm 48 is configured to force the bottle 12 from the first path 28 to follow the second path 30.

In the present embodiment, the arm 48 forms a pusher.

The drive unit 50 of the arm 48 comprises, for example, a housing 70 and an electric motor (not shown in the figures).

The housing 70 is attached to the holder 40 of the sorting device 24.

The housing 70 is arranged outside the first path 28.

The housing 70 at least partially accommodates the rods 66.

The electric motor is configured to drive the arm 48 in translation relative to the housing 70 between the first position P1 and the plurality of second positions P2.

The electric motor is housed in the housing 70.

In this case, the arm 48, the housing 70, and the drive unit 50 form an electromechanical cylinder.

The calculator 52 has a memory (not shown in the figures).

The calculator 52 memory stores at least one database.

In this case, the calculator 52 stores a first database and a second database.

The first database comprises data relating to the bottles 12.

For example, the first database further comprises data relating to a number of bottles 12, for example a number of bottles 12 in the order.

Thus, by way of illustration, the first database is representative of an order of bottles 12.

The second database stores data relating to the chip 20, namely identifiers of the chips.

The data relating to the bottles 12 and the data relating to the chips 20 stored in the calculator 52 memory form predefined data.

The calculator 52 is adapted to compare the at least one data item read by the chip reader 46 with the predefined data to determine a defective state of the chip 20 or a valid state of the chip 20.

The calculator 52 is adapted to output a control law L of the arm 48 controlling the position of the arm 48. The control law L of the arm 48 depends on the data read from the memory of the chip 20.

The control law L is the output of a function, denoted f, stored in a memory of the calculator 52.

The function f associates with inputs E an output, i.e. the control law L.

In other words, f(E)=L.

The inputs E to the function f comprise at least the state of the chip 20, i.e. the valid state or defective state of the chip 20. The control law L of the arm 48 therefore depends on the defective or valid state of the chip 20.

A defective state of the chip 20 may correspond to a broken chip 20.

Alternatively or additionally, a defective state of the chip 20 corresponds to a bad connection between the antenna and the microprocessor of the chip 20.

Alternatively or additionally, a defective state corresponds to an unknown identifier of the chip 20 in the second database.

The determination of the defective state and valid state of the chip 20 by the calculator 52 will be explained with reference to the sorting method.

The valid state of the chip 20 is defined as opposed to the defective state.

In addition, the function f takes as input E at least one of the following input parameters:

- the distance in the longitudinal direction X between the chip reader 46 and the second path 30,
- the speed at which the bottles 12 are driven along the first path 28,
- a width of the first path 28 measured in the transverse direction Y,
- a weight of the bottle 12 being transported,
- an initial position of the arm 48, corresponding to the first position P1 in the reference frame X, Y, Z,
- the position of the arm 48 in the plurality of second positions P2 in the frame X, Y, z,
- the minimum distance measured in the longitudinal direction X between two bottles 12 on the conveyor 22,
- a speed of movement of the arm 48, and
- a reaction time of arm 48.

The control law L gives the position of arm 48 over time.

By way of illustration, the position of the arm 48 is a set of coordinates of the arm 48 in the reference frame X, Y, Z.

The position of the arm 48 is, for example, the position of the distal end 68 of the arm 48.

The function f is such that when the chip 20 has a defective state, the position of the distal end 68 of the arm 48 is different from the position P1. In other words, the position of the distal end 68 of the arm 48 over time comprises positions P2, each position $P2_i$, $P2_{max}$ being time-dependent.

The function f is also such that when the chip 20 is in the valid state, the position of the distal end 68 of the arm 48 is equal to the first position P1.

According to a particular embodiment, the function f is a function integrating at least one other input E from the list of input parameters defined above.

For example, the function f comprises, in addition to the state of the chip 20 as an input E, at least one other input E such as the weight of the bottle 12. The function f is, for example, such that the greater the weight of the bottle 12, the greater the power of the electric motor driving the arm 48.

According to another example, the function f comprises, in addition to the state of the chip 20 as input E, the speed of the bottles 12. The function f is then such that the higher the speed at which the bottles 12 are being driven on the conveyor 22, the higher the speed of the electric motor driving the arm 48.

In this case, the control law L also controls the configuration of the visual indicator 56 over time.

The display unit 54 comprises a touch screen. In this case, the display unit 54 and the HMI interface are merged.

The display unit 54 comprises a non-touch screen. In this case, the HMI interface comprises, for example, a keyboard.

The indicator 56 comprises, in this case, a light source (not shown in the figures).

The indicator 56 has at least a first configuration and a second configuration.

In the first configuration, the indicator 56 is representative of the first position P1 of the arm 48. In the first configuration, the light sources are switched off.

In the second configuration, the indicator 56 is representative of the arm 48 in the second position P2. In the second configuration, the light sources are lit or flashing.

The control law L of the arm 48 is suitable to also control the indicator 56 in either configuration.

In this case, the indicator 56 is a visual indicator but, alternatively, indicator 56 could be a sound indicator.

A sorting method implemented by the previously described sorting device 24 is now described.

The bottle 12 sorting method is described in relation to a single bottle 12 but is repeated for each other bottle 12 in the corresponding order.

Initially, the arm 48 is in the first position P1 as seen in FIGS. 1 and 2.

A bottle 12 is positioned on the forward run 32 of the conveyor belt 26 of the conveyor 22, i.e. on the first path 28.

The forward run 32 drives the bottle 12 in the driving direction T.

When the bottle 12 arrives in the vicinity of the bottle detector 42, the detector 42 detects the bottle 12.

Once the detector 42 has detected a bottle 12, the detector 42 activates the chip reader 46 in the active operating mode.

The bottle 12 then arrives at the trim unit 44.

The two positioning cylinders 62 position the bottle 12 into the position for receiving the chip 20.

The application cylinder 64 applies the chip 20 to the barrel 14 of the bottle 12 above the label 16.

Next, the bottle 12 arrives in front of the chip reader 46.

The chip reader 46 writes to the memory of the chip 20 the information about the bottle 12 that is listed in the first database for that bottle 12.

After writing to the chip 20, the chip reader 46 reads the written data relating to the bottle 12 and the chip 20 identifier stored in the chip 20 memory.

The calculator 52 compares the data read for the bottle 12 with the data in the first database for that bottle 12 and the chip 20 identifier with the data in the second database.

If the data read for the bottle 12 is different from the data stored in the first database for that bottle 12 and/or if the identifier read is different from any of the identifiers listed in the second database, a defective state of the chip 20 of that bottle 12 is determined.

The read data different from the stored predefined data correspond for example to at least one of the following characteristics: No read data, incomplete read data, unknown chip 20 identifier.

In this case, the calculator 52 determines a defective state of the chip 20.

As a result of the determination of a defective state of the chip 20, the calculator 52 outputs the control law L of the arm 48. The control law L is the output of the function f which takes as input E at least the defective state of the chip 20.

Alternatively, the function f comprises at least one other input from the previously defined list of input parameters.

The calculator 52 then outputs the control law L of the arm 48 which is a function of the defective state of the chip 20.

The control law L gives the plurality of second positions P2 and the position P1 of the arm 48 as a function of time.

In particular, the control law L gives the plurality of intermediate positions $P2_i$ and the maximum extension position $P2_{max}$ as a function of time.

The control law L then controls the arm 48 in translation along the transverse direction Y from the first position P1 in a plurality of second intermediate positions $P2_i$ (visible in FIGS. 3 to 5) to the maximum extension position $P_{max}$ (visible in FIG. 6).

In each second position P2, the arm 48 forces the bottle 12 from the first path 48 to follow the second path 30. In the second positions P2, the distal end 68 of the arm 48 is in contact with the bottle 12.

Once the arm 48 has reached the maximum extension position $P2_{max}$, the control law L controls the return of the arm 48 to the first position P1 (visible in FIGS. 1 and 2).

In addition, the control law L further comprises the control of the visual indicator 56 in the second configuration. Then the control law L controls the lighting of the light sources of the visual indicator 56.

If in the comparison step, the data read for the bottle 12 is similar to the data stored in the first database and the data for the chip 20 is similar to at least one data in the second database, the calculator 52 determines a valid state of the chip 20.

The calculator 52 then outputs a control law L which is the output of the function f taking at least as input E the valid state of the chip 20. In other words, the control law L depends on the valid state of the chip 20.

The control law L delivers the position of the arm 48 in the first position P1. Then the control law L keeps the arm 48 in the first position P1. In this case, the arm 48 remains in the first position P1 away from the first path 28.

The control law L also controls the visual indicator 56 in the first configuration. Thus, the control law L keeps the light sources of the visual indicator 56 switched off.

Furthermore, the number of bottles 12 stored in the first database is decremented by one bottle 12.

The sorting device 24 therefore allows for controlled, optimal oversight of the distributor's or retailer's order.

In fact, the chips 20 are automatically checked and the sorting device 24 allows the bottles 12 to be sorted by eliminating the bottles 12 with a defective chip 20. The sorting device 24 therefore allows accelerated checking of the bottles 12 fitted with chips 20, by dispensing with a particularly long and tedious manual check of the bottles.

In addition, the sorting device 24 allows the number of bottles 12 in the order to be checked automatically. In particular, this avoids errors in the counting of bottles 12.

The sorting device 24 therefore allows the bottles 12 to be crated quickly while ensuring the validity of the chips 20 carried by the bottles 12.

Alternatively, the chip reader 46 is not able to write to the memory of the chip 20. In this case, the sorting device 24 may not include a trim unit 44.

For example, the bottles 12 are initially provided with the chip 20 storing the data relating to the bottle 12 and the chip 20 before passing into the sorting device 24.

The sorting method differs from the previously described sorting method in that it does not comprise a step of writing to the chip 20.

Alternatively, the sorting device 24 further comprises a code reader.

In this embodiment, the bottle 12 comprises, in addition to the electronic chip 20, a bar code or square code, representative of one or more additional information relating to the bottle 12.

The code reader is able to read the or each additional information.

The code reader is, for example, connected to the chip reader 46.

Furthermore, in the case in point, the code reader is arranged upstream of the chip reader 46 in the direction of travel T on the first path 28.

The sorting method differs from the previously described sorting method in that it comprises, prior to the chip reader 46 reading the data stored in the chip 20, the reading of additional information relating to the bottle 12.

Thus, when the bottle 12 comes in front of the chip reader 46, the chip reader 46 writes the information about the chip 20 into the memory of the chip 20 and the additional information read.

Alternatively, the sorting device 24 further comprises a second chip reader.

The second chip reader is, for example, a manual reader. For example, the chip reader is a personal digital assistant (PDA).

The sorting process differs from the previously described sorting method in that it comprises reading the chip 20 using the second chip reader.

The second chip reader can, for example, read chips 20 positioned on larger bottles 12 that the chip reader 46 described in the embodiment of FIGS. 1 to 3 would not be able to read.

Yet another embodiment of the sorting device 24 is described in the following with reference to FIGS. 7 to 10. This embodiment is described only in contrast to the embodiment of FIGS. 1 to 6.

In this embodiment, the only difference is the arm 48 and the drive unit 50 of the arm 48.

In this embodiment, the arm 48 is rotatable about the vertical direction Z.

The arm 48 has a barrier 72, for example, of parallelepiped shape.

The barrier 72 projects from the first path 28 and the bottom 36 of the second path 30.

The barrier 72 has two sides.

In this case, one of the side faces is intended to be in contact with the bottle 12.

In the following, the position of the arm 48 is, for example, marked by the position of the free end of the barrier 72 in the reference frame X, Y, Z.

In the first position P1 of the arm 48, the barrier 72 is away from the first path 28.

In the first position P1 of the arm 48, the barrier 72 is located in the second path 30. In other words, the orthogonal projection of the arm 48 in the plane of the first path 28 is located outside the first path 28.

Figure 9:
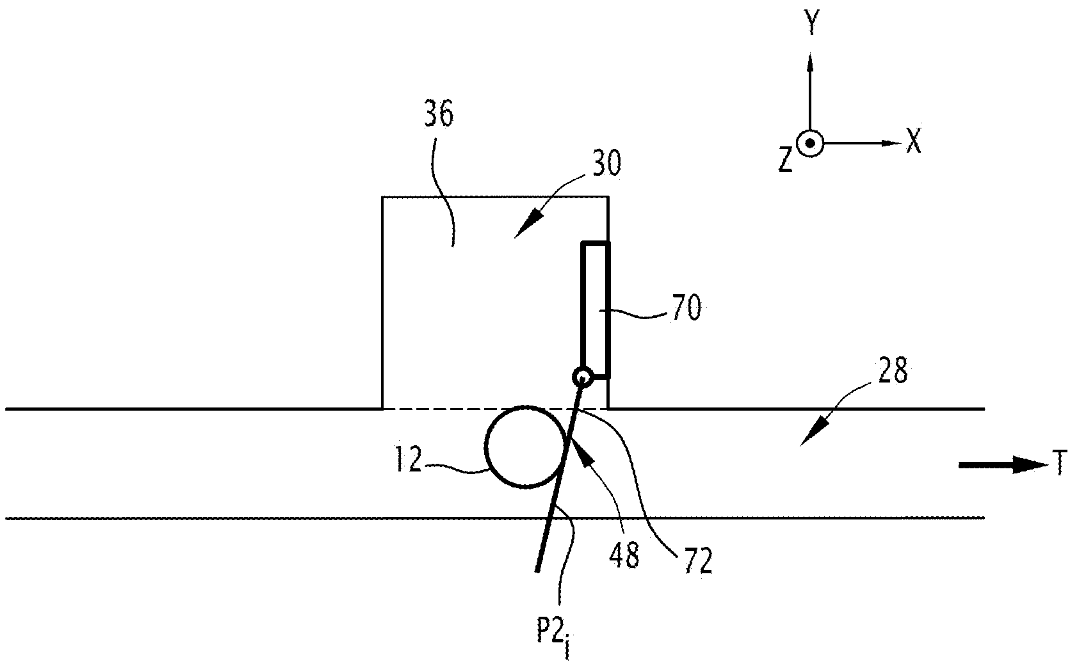
Figure 10:
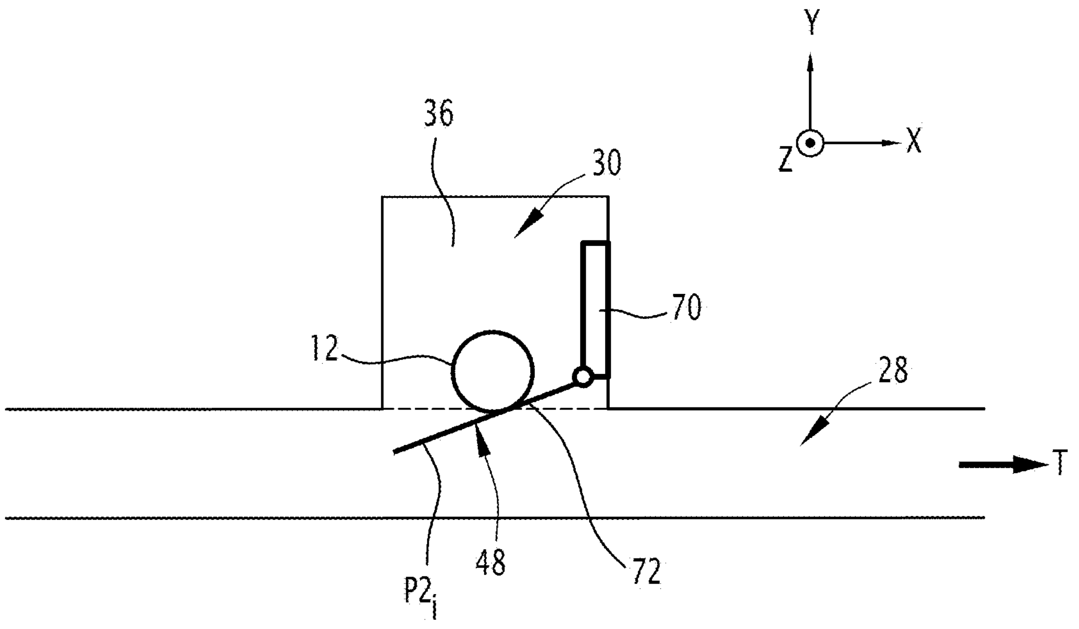

The arm 48 is configured to have a plurality of second positions P2. A plurality of second positions P2 are illustrated in FIGS. 8 to 10.

Each second position P2 is distinct from the first position P1.

In each second position P2, the arm 48 extends at least partially across the first path 28. In particular, in each second position P2, the orthogonal projection of the barrier 72 in the plane of the first path 28 is located at least partly on the first path 28.

Figure 8:
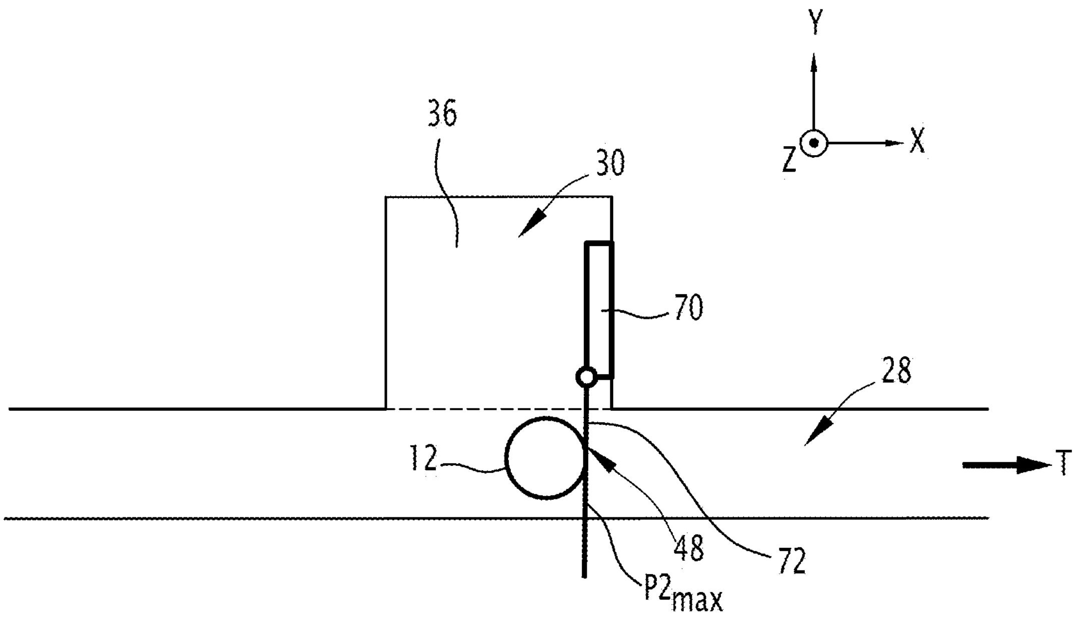

FIG. 8 shows arm 48 in the $P2_{max}$ position of maximum extension. The $P2_{max}$ position of maximum extension corresponds to the maximum rotation angle of the arm 48 from the first position P1.

In this case, in the $P2_{max}$ position of maximum extension of the arm 48, the arm 48 extends across the entire first path 28.

In each second position P2, the arm 48 is configured to force the bottle 12 from the first path 28 to follow the second path 30.

Thus, the arm 48 is movable between the first position P1 and the maximum rotational position $P2_{max}$ through a plurality of second intermediate positions $P2_i$.

Housing 70 houses the electric motor. For example, the housing 70 is arranged in the second path 30, away from the first and second paths 28.

The electric motor (not shown in the figures) is configured to drive the arm 48 in rotation about the vertical axis Z.

The sorting method is described in contrast to the sorting method described with reference to FIGS. 7 to 10.

Initially, the arm 48 is in the first position P1.

In the event that the calculator 52 determines a defective state of the chip 20, the calculator 52 outputs the control law L. The control law L is the output of the function f which takes at least as input the defective state of the chip 20.

The output control law L gives the position of the arm 48 in the plurality of second positions P2 over time.

In particular, the control law L gives the position of the arm in the maximum extension position $P2_{max}$ and the plurality of intermediate positions $P2_i$ as a function of time.

Thus, in the present embodiment, from the initial position P1 (visible in FIG. 7), the arm 48 is first rotated to the maximum extension position $P2_{max}$. Thus, the bottle 12 with the defective chip 20 driven on the first path 28 comes into contact with the barrier 72 of the arm 48 and is blocked by the arm 48.

Then, from the maximum extension position $P2_{max}$, the arm 48 is rotated through the plurality of intermediate second positions $P2_i$ (FIGS. 9 and 10) to the first position P1 to force the bottle 12 to follow the second path 30.

Thus, in the plurality of second positions P2, the arm 48 forces the bottle 12 onto the second path 30.

In this embodiment, the arm 48 forms a shunter.

The sorting device 24 thus allows, with easy implementation, an increase in the capacity to crate the containers 12 and an acceleration of the checking of the container orders.

In particular, by means of the sorting device 24, the containers 12 to be crated for an order with defective chips 20 are sorted automatically, thus saving considerable time and freeing up manpower for other tasks.

What is claimed is:

1. A sorting device for sorting bottles containing an alcoholic liquid for a conveyor of bottles containing an alcoholic liquid, each specific bottle of the bottles containing the alcoholic liquid comprising an electronic chip comprising a memory storing at least one data item from among a data item relating to the specific bottle containing the alcoholic liquid and a data item relating to the electronic chip, the conveyor being suitable for driving the bottles containing the alcoholic liquid, the conveyor having at least a first path and a second path, the sorting device comprising:

a chip reader configured to read the at least one data item stored in the memory of the electronic chip, referred to as read data, an arm movable between a first position and at least one second guiding position, the at least one second guiding position being distinct from the first position, and in the at least one second guiding position, the arm being configured to force the bottles containing the alcoholic liquid from the first path to follow the second path, the arm being rotatable between the first position and the at least one second position, the arm having a distal end configured to contact with each specific bottle containing the alcoholic liquid, a calculator comprising a memory storing a first database and a second database, wherein the first database comprises data relating to the bottles, and the second database comprises chip identifiers for the bottles, wherein the calculator is configured to (i) compare data read for the specific bottle with the data stored in the first database for that bottle and (ii) compare the electronic chip of the specific bottle with the chip identifiers stored in the second database, the calculator is further configured to determine a defective state of the electronic chip when no or incomplete data is read for the electronic chip for the specific bottle, and the calculator controls the position of the arm by outputting a control law depending on the defective state of the electronic chip.

2. The sorting device according to claim 1, wherein in the first position, the arm is away from the first path and in the at least one second guiding position, the arm extends at least partially across the first path.

3. The sorting device according to claim 1, wherein the arm is movable between a first position and a plurality of second guiding positions in which the specific bottle containing the alcoholic liquid is forced along the second path, the arm extending at least partially across the first path in each second guiding position.

4. The sorting device according to claim 1, further comprising a trim unit of the bottles containing the alcoholic liquid configured to deposit the electronic chip on the specific bottle containing the alcoholic liquid.

5. The sorting device according to claim 1, wherein the defective state of the electronic chip is a broken chip or a bad connection between an antenna and a microprocessor of the electronic chip.

6. A facility for sorting bottles containing an alcoholic liquid, the facility comprising:

a conveyor capable of driving the bottles containing the alcoholic liquid to be sorted, the conveyor having at least a first path and a second path, and a sorting device for sorting the bottles containing the alcoholic liquid, the sorting device driven by the conveyor, each specific bottle of the bottles containing the alcoholic liquid comprising an electronic chip comprising a memory storing at least one data item from among a data item relating to the specific bottle containing the alcoholic liquid and a data item relating to the electronic chip, the sorting device comprising:

a chip reader configured to read the at least one data item stored in the memory of the electronic chip, referred to as read data, an arm movable between a first position and at least one second guiding position, the at least one second guiding position being distinct from the first position, and in the at least one second guiding position, the arm being configured to force the bottles containing the alcoholic liquid from the first path to follow the second path, the arm being rotatable between the first position and the at least one second position, the arm having a distal end configured to contact with each specific bottle containing the alcoholic liquid, a calculator comprising a memory storing a first database and a second database, wherein the first database comprises data relating to the bottles, and the second database comprises chip identifiers for the bottles, wherein the calculator is configured to (i) compare data read for the specific bottle with the data stored in the first database for that bottle and (ii) compare the electronic chip of the specific bottle with the chip identifiers stored in the second database, the calculator is further configured to determine a defective state of the electronic chip when no or incomplete data is read for the electronic chip for the specific bottle, and the calculator controls the position of the arm by outputting a control law depending on the defective state of the electronic chip.

7. A sorting device for sorting bottles containing an alcoholic liquid for a conveyor of bottles containing an alcoholic liquid, each specific bottle containing the alcoholic liquid comprising an electronic chip comprising a memory storing at least one data item from among a data item relating to the specific bottle containing the alcoholic liquid and a data item relating to the electronic chip, the conveyor being suitable for driving the bottles containing the alcoholic liquid, the conveyor having at least a first path and a second path, the sorting device comprising:

a trim unit configured to deposit the electronic chip on the bottles containing the alcoholic liquid, a chip reader configured to read the at least one data item stored in the memory of the electronic chip, referred to as read data, an arm movable between a first position and at least one second guiding position, the at least one second guiding position being distinct from the first position, and in the at least one second guiding position, the arm being configured to force the bottles containing the alcoholic liquid from the first path to follow the second path, the arm being rotatable between the first position and the at least one second position, the arm having a distal end configured to contact with each specific bottle containing the alcoholic liquid, and a calculator comprising a memory storing a first database and a second database, wherein the first database comprises data relating to the bottles, and the second database comprises chip identifiers for the bottles, wherein the calculator is configured to (i) compare data read for the specific bottle with the data stored in the first database for that bottle and (ii) compare the electronic chip of the specific bottle with the chip identifiers stored in the second database, the calculator is further configured to determine a defective state of the electronic chip when no or incomplete data is read for the electronic chip for the specific bottle, the calculator further configured to output a control law for the arm which controls the position of the arm and depends on the at least one read data.

* * * * *